(12) United States Patent
Zhou et al.

(10) Patent No.: US 10,684,203 B2
(45) Date of Patent: Jun. 16, 2020

(54) RING SHEAR AND SEEPAGE-COUPLED APPARATUS AND RING SHEAR AND SEEPAGE-COUPLED TEST SYSTEM FOR ROCK AND ROCK FRACTURE UNDER TENSION OR COMPRESSION STRESS

(71) Applicant: Institute of Rock and Soil Mechanics, Chinese Academy of Sciences, Wuhan, Hubei Province (CN)

(72) Inventors: Hui Zhou, Wuhan (CN); Yue Jiang, Wuhan (CN); Jingjing Lu, Yuhan (CN); Chuanqing Zhang, Wuhan (CN); Dawei Hu, Wuhan (CN); Yang Gao, Wuhan (CN); Fanjie Yang, Wuhan (CN); Yong Zhu, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 275 days.

(21) Appl. No.: 15/950,318

(22) Filed: Apr. 11, 2018

(65) Prior Publication Data

US 2019/0011344 A1    Jan. 10, 2019

(30) Foreign Application Priority Data

Jul. 6, 2017    (CN) .......................... 2017 1 0545541

(51) Int. Cl.
*G01N 3/24*    (2006.01)
*G01N 3/10*    (2006.01)
(Continued)

(52) U.S. Cl.
CPC ................. *G01N 3/24* (2013.01); *G01N 3/10* (2013.01); *G01N 3/02* (2013.01); *G01N 15/082* (2013.01);
(Continued)

(58) Field of Classification Search
CPC .. G01N 3/24; G01N 3/10; G01N 3/02; G01N 2203/0067; G01N 2203/0025;
(Continued)

(56) References Cited

U.S. PATENT DOCUMENTS 5,739,436 A * 4/1998 Trautwein ................ G01N 3/24
73/841
5,920,005 A * 7/1999 Moss ....................... G01N 3/24
73/9

(Continued)

*Primary Examiner* — Jonathan M Dunlap
(74) *Attorney, Agent, or Firm* — Leason Ellis LLP

(57) ABSTRACT

A ring shear and seepage-coupled apparatus and a ring shear and seepage-coupled test system for rock and rock fracture under tension or compression stress are provided, relating to the technical field of mechanical testing devices. As to the ring shear and seepage-coupled apparatus, an axial piston rod is connected with an upper shear box, a torque transferring shaft is connected with a lower shear box, an axial force transducer is provided on the axial piston rod, a torque transducer is provided on the torque transmitting shaft, and a force transferring plate is fixedly connected onto the upper shear box. The force transferring plate is able to transmit a counter force for exerting a torque. Radial and circumferential seepage tests can be achieved by providing a seepage structure. The ring shear and seepage-coupled test system comprises a servo pump and the ring shear and seepage-coupled apparatus as mentioned above.

18 Claims, 2 Drawing Sheets

(51) Int. Cl.
    *G01N 15/08*     (2006.01)
    *G01N 3/02*     (2006.01)
    *G01N 15/00*     (2006.01)

(52) U.S. Cl.
    CPC . *G01N 15/0806* (2013.01); *G01N 2015/0034* (2013.01); *G01N 2203/0017* (2013.01); *G01N 2203/0019* (2013.01); *G01N 2203/0025* (2013.01); *G01N 2203/0026* (2013.01); *G01N 2203/0048* (2013.01); *G01N 2203/0067* (2013.01); *G01N 2203/0236* (2013.01); *G01N 2203/0274* (2013.01)

(58) Field of Classification Search
    CPC ... G01N 2203/0026; G01N 2203/0274; G01N 2203/0236; G01N 2203/0048; G01N 2203/0019; G01N 2203/0017; G01N 15/0806; G01N 15/082; G01N 2015/0034
    See application file for complete search history.

(56) References Cited

U.S. PATENT DOCUMENTS

| | | | |
|---|---|---|---|
| 8,656,788 B2* | 2/2014 | Jeong | G01N 3/24 |
| | | | 73/815 |
| 9,714,891 B2* | 7/2017 | Liu | G01N 3/10 |
| 10,168,263 B2* | 1/2019 | Su | G01N 3/24 |
| 10,197,483 B2* | 2/2019 | Du | G01N 3/24 |
| 10,564,079 B2* | 2/2020 | Ma | G01N 33/24 |
| 2013/0112013 A1* | 5/2013 | Jeong | G01N 3/24 |
| | | | 73/862.581 |
| 2018/0128725 A1* | 5/2018 | Du | G01N 3/24 |

* cited by examiner

RING SHEAR AND SEEPAGE-COUPLED APPARATUS AND RING SHEAR AND SEEPAGE-COUPLED TEST SYSTEM FOR ROCK AND ROCK FRACTURE UNDER TENSION OR COMPRESSION STRESS

CROSS-REFERENCE TO RELATED APPLICATIONS

The present application claims the priority to the Chinese patent application with the filing No. CN201710545541.6, filed with the State Intellectual Property Office on Jul. 6, 2017, entitled "Ring Shear and Seepage-Coupled apparatus and Ring Shear and Seepage-Coupled Test System for Rock and Rock Fracture under Tension or Compression Stress", contents of which are incorporated herein by reference in its entirety.

TECHNICAL FIELD

The present disclosure relates to the technical field of mechanical testing devices, and particularly to a ring shear and seepage-coupled apparatus and ring shear and seepage-coupled test system for rock and rock fracture under tension or compression stress.

BACKGROUND ART

The shear strength of rocks is one of significant indexes to evaluate the mechanical properties of rocks, and accurately obtaining the strength parameter has important practical significance for rock mass engineering. At the present stage, the shear strength of rocks is obtained mainly through laboratory tests, and the tests are mainly divided into the following types: conventional tri-axial tests, direct shear tests and wedge shear tests.

After analyzing the implementation models of existing tests, it is found that the force applied to the shear surface of rocks during the shearing process is uneven, and the deformation is delayed, thus, the shear strength of rocks cannot be accurately reflected. During the working process of a rock tension-compression-ring shear tester, the process of applying an axial force and the process of applying a torque might interfere with each other, resulting in the decrease in the precision and reliability of a force applied to a hollow rock specimen, which leads to a relatively great error in the acquisition of test results.

In view of this, a technical problem to be urgently solved currently in the technical field of mechanical testing devices is to design and manufacture a ring shear and seepage-coupled apparatus for rock and rock fracture under tension or compression stress, which can simultaneously complete an axial tension-compression test, a ring shear test and a seepage test, wherein not only an axial load and a ring shear torque can be independently applied without interfering with each other, but also a test of mutual coupling can be realized.

SUMMARY

Embodiments of the present disclosure provide a ring shear and seepage-coupled apparatus for rock and rock fracture under tension or compression stress used for tension-compression-ring shear-seepage tests of rocks. The ring shear and seepage-coupled apparatus for rock and rock fracture under tension or compression stress realizes uniform force applied to a shear surface and uniform deformation of a rock by utilizing a ring specimen and through a mode of applying a torque; and at the same time, can apply axial tensile force and pressure to realize tests of rock tension, compression, ring shear, seepage and mutual coupling, being significant in accurate acquisition of shear strength, residual strength and deformation of a rock, and in the improvement and perfection of the constitutive relation of the rock.

Embodiments of the present disclosure further provide a ring shear and seepage-coupled test system for rock and rock fracture under tension or compression stress, comprising a servo pump, a hydraulic cylinder and the ring shear and seepage-coupled apparatus for rock and rock fracture under tension or compression stress as mentioned above, wherein the ring shear and seepage-coupled test system for rock and rock fracture under tension or compression stress is precise in control and small in error, can apply axial tensile force and pressure to realize tests of rock tension, compression, ring shear, seepage and mutual coupling, and is perfect in function.

The present disclosure improves its technical problem by employing the following technical solutions.

The present disclosure provides a ring shear and seepage-coupled apparatus for rock and rock fracture under tension or compression stress, comprising a first frame, a second frame, a first bottom plate, a second bottom plate, an axial piston rod, a torque transferring shaft, an axial force transducer, a torque transducer, an upper shear box, a lower shear box and a seepage structure.

The first frame is in fixed connection with the first bottom plate, the second frame is in fixed connection with the second bottom plate, the first frame is positioned between the first bottom plate and the second bottom plate, and the second frame is positioned at a side of the second bottom plate, with the side away from the first bottom plate. The upper shear box and the lower shear box are positioned in the second frame, a specimen is fixedly arranged between the upper shear box and the lower shear box, and the upper shear box, the lower shear box and the specimen are positioned along the same axis.

The torque transducer is provided on the torque transferring shaft. The torque transferring shaft has one end fixedly connected onto the first bottom plate, and the other end penetrating through the second bottom plate and in fixed connection with the lower shear box, so as to transmit a torque to the specimen. The axial force transducer is provided on the axial piston rod, which is in fixed connection with the upper shear box for applying an axial load to the specimen.

The seepage structure includes a circumferential seepage structure and a radial seepage structure, wherein the circumferential seepage structure is configured for performing a circumferential seepage test, and the radial seepage structure is configured for performing a radial seepage test.

Further, jacks are provided within the first frame and in fixed connection with two sides of the first frame for applying a torque to the torque transferring shaft.

Further, a plurality of support rods are provided within the first frame, wherein two ends of each support rod are fixed at both sides of the first frame respectively, for stabilizing the ring shear and seepage-coupled apparatus for rock and rock fracture under tension or compression stress.

Further, a force transferring plate is provided within the second frame, the force transferring plate is in fixed connection with the upper shear box, two ends of the force transferring plate are respectively in connection with the second frame and can slide along inner walls of the second frame, and the force transferring plate is configured to transmit a counter force for applying a torque, so as to maintain the upper shear box stable.

Further, linear guideways are provided on inner side walls of the second frame, each linear guideway is provided thereon with a sliding block slidable relative to the linear guideway, and the force transferring plate is in fixed connection with the sliding blocks and is slidable along the linear guideways.

Further, upper and lower surfaces of the first bottom plate, the second bottom plate, the upper shear box, the lower shear box and the force transferring plate, and two end faces of the axial piston rod and two end faces of the torque transferring shaft are parallel with each other.

Further, the jacks and the torque transducer are mounted in parallel with each other, and the jacks and the torque transducer are all perpendicular to a side wall of the first frame. The linear guideway is parallel with a side wall of the second frame, and the linear guideway and the second bottom plate are perpendicular to each other.

Further, the radial seepage structure includes a sealing sleeve, a first water inlet channel, a first gas exhaust channel, a second water inlet channel and a second gas exhaust channel. The sealing sleeve is in fixed connection with the upper shear box and the lower shear box respectively, and sealing rings are provided between the sealing sleeve and the upper shear box and between the sealing sleeve and the lower shear box respectively.

The first water inlet channel is provided at the lower shear box, the first gas exhaust channel is provided at the upper shear box, and the first water inlet channel and the first gas exhaust channel are in communication with each other through a hollow portion of the specimen, hereby forming an internal seepage channel. The second water inlet channel is provided at the lower shear box and positioned at an outside of the specimen, the second gas exhaust channel is provided at the upper shear box and positioned at the outside of the specimen, and the second water inlet channel and the second gas exhaust channel are in communication with each other, hereby forming an external seepage channel.

Further, the circumferential seepage structure includes a sealing sleeve, a third water inlet channel and a third water drainage channel. The sealing sleeve is in fixed connection with the upper shear box and the lower shear box respectively, and sealing rings are provided between the sealing sleeve and the upper shear box and between the sealing sleeve and the lower shear box respectively.

The third water inlet channel is provided at the lower shear box, the third water drainage channel is provided at the upper shear box, and the specimen is provided with a flow channel enabling the third water inlet channel to be in communication with the third water drainage channel, hereby forming a circumferential seepage channel.

A ring shear and seepage-coupled test system for rock and rock fracture under tension or compression stress provided in the present disclosure comprises a servo pump, a hydraulic cylinder and the ring shear and seepage-coupled apparatus for rock and rock fracture under tension or compression stress as mentioned above, wherein the axial piston rod is provided within the hydraulic cylinder, and the servo pump is in connection with the hydraulic cylinder for controlling the movement of the axial piston rod.

The ring shear and seepage-coupled apparatus and the ring shear and seepage-coupled test system for rock and rock fracture under tension or compression stress provided in the present disclosure have the following beneficial effects in several aspects.

As to the ring shear and seepage-coupled apparatus for rock and rock fracture under tension or compression stress provided in the present disclosure, radial and circumferential seepage tests can be realized by connecting an axial piston rod with an upper shear box, connecting a torque transferring shaft with a lower shear box, providing an axial force transducer on the axial piston rod, and providing a torque transducer on the torque transmitting shaft, and through the arrangement of a seepage structure. The ring shear and seepage-coupled apparatus for rock and rock fracture under tension or compression stress realizes independent and coupled applying of an axial load and a torque, and guarantees the stability of the testing device and the stable applying of the load during a loading process in the test. It has a simple structure and enables convenient operation and control, is suitable for mechanical tests on rocks of various shapes, and is significant in studying of various mechanical properties of rocks.

The ring shear and seepage-coupled test system for rock and rock fracture under tension or compression stress provided in the present disclosure, comprising the servo pump, the hydraulic cylinder and the ring shear and seepage-coupled apparatus for rock and rock fracture under tension or compression stress as mentioned above, is precise in control, small in error and good in stability. The ring shear and seepage-coupled test system for rock and rock fracture under tension or compression stress can be used to study the shear strength and the residual strength of rocks and to perfect the strength model of rocks, and to comprehensively analyze the mechanical characteristics of rocks, having an extremely great popularization and application value.

BRIEF DESCRIPTION OF THE DRAWINGS

In order to more clearly describe the technical solutions of the examples of the present disclosure, the drawings to be used in the examples will be simply presented below. It shall be understood that the following drawings merely show certain examples of the present disclosure, and thus should not be construed as limiting the scope thereof, and for a person skilled in the art, other relevant drawings could be obtained according to these drawings without using inventive efforts.

Figure 1:
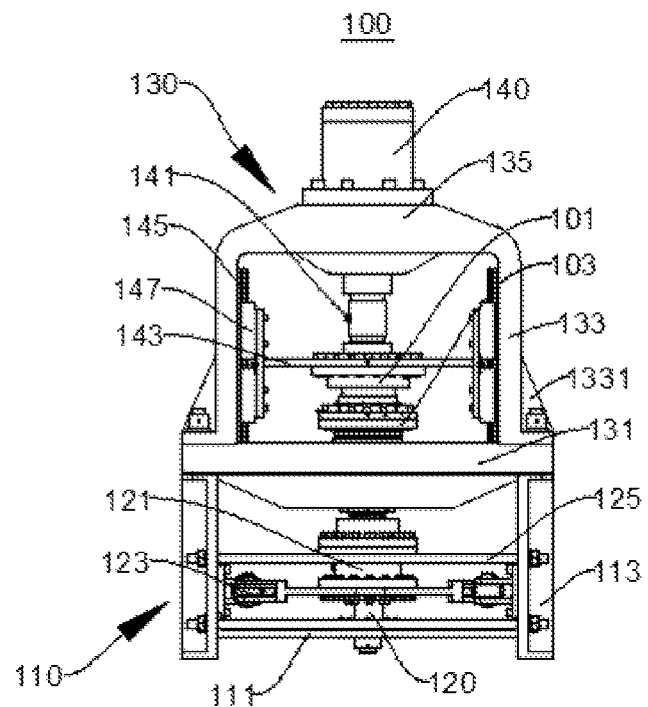
FIG. 1 is a structural schematic diagram of a ring shear and seepage-coupled apparatus for rock and rock fracture under tension or compression stress provided in Embodiments of the present disclosure, from an angle of view.

Reference signs: 100—ring shear and seepage-coupled apparatus; 101—upper shear box; 103—lower shear box; 105—specimen; 110—first frame; 111—first bottom plate; 113—first side plate; 120—torque transferring shaft; 121—torque transducer; 123—jack; 125—support rod; 130—second frame; 131—second bottom plate; 133—second side plate; 1331—mounting part; 135—cover plate; 140—axial piston rod; 141—axial force transducer; 143—force transferring plate; 145—linear guideway; 147—sliding block; 150—sealing sleeve; 151—first water inlet channel; 153—first gas exhaust channel; 155—sealing ring; 157—second water inlet channel; 158—second gas exhaust channel; 161—third water inlet channel; and 163—third water drainage channel.

DETAILED DESCRIPTION OF THE EMBODIMENTS

In order to make the objects, the technical solutions and the advantages of the examples of the present disclosure clearer, the technical solutions in the examples of the present disclosure will be clearly and comprehensively described below with reference to the drawings of the examples of the present disclosure. Obviously, the described examples are merely some but not all examples of the present disclosure. Generally, the assemblies of the examples of the present disclosure that are described and shown here in the drawings may be arranged and designed according to various configurations.

Thus, the following detailed description of the examples of the present disclosure that are provided in the drawings merely represents selected examples of the present disclosure, rather than being intended to limit the scope of the present disclosure for which protection is sought. Based on the examples in the present disclosure, all further examples that could be obtained by a person skilled in the art without using inventive efforts fall within the scope of protection of the present disclosure.

In the description of the present disclosure, it shall be understood that orientation or position relationships indicated by terms, such as "upper", "lower", etc., are orientation or position relationships shown based on the drawings, or orientation or position relationships in which the product of the present disclosure is conventionally placed during use, or orientation or position relationships that could be conventionally understood by a person skilled in the art. The terms are used only for facilitating the description of the present disclosure and for simplifying the description, rather than indicating or implying that the specified apparatus or element must have a specific orientation, and be constructed and operated in a certain orientation, and therefore cannot be construed as limiting the present disclosure.

Terms, such as "first", "second", etc., in the present disclosure are merely used for distinguishability in the description, rather than having any special meaning.

In the description of the present disclosure, it shall be clarified that unless otherwise expressly specified and defined, terms such as "provide" and "mount" shall be construed in a broad sense, for example, it could be either fixed connection, or detachable connection, or integrated connection; or it could be either direct connection, or indirect connection through an intermediate. For a person skilled in the art, the specific meanings of the above-mentioned terms in the present disclosure could be construed in accordance with specific circumstances.

Figure 2:
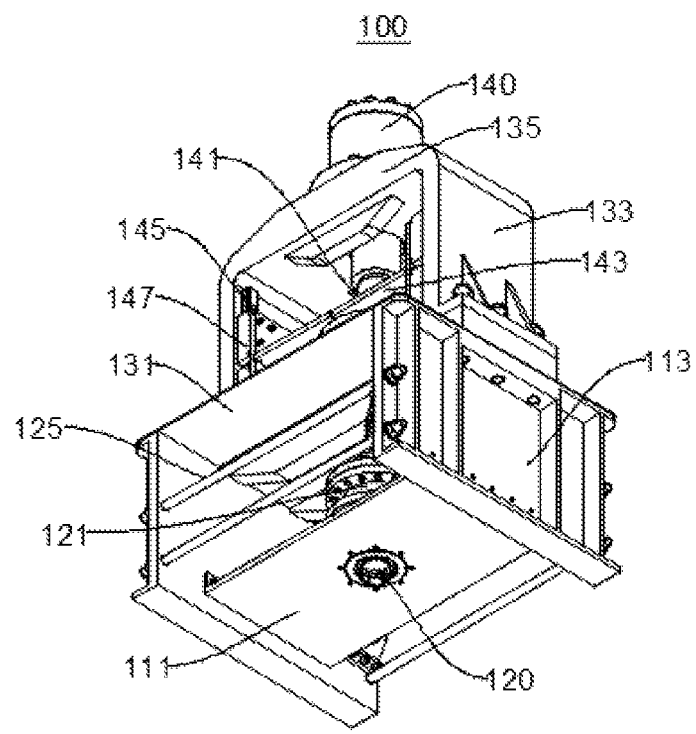
FIG. 2 is a structural schematic diagram of the ring shear and seepage-coupled apparatus for rock and rock fracture under tension or compression stress provided in Embodiments of the present disclosure, from another angle of view.

FIG. 1 is a structural schematic diagram of a ring shear and seepage-coupled apparatus 100 for rock and rock fracture under tension or compression stress provided in Embodiments of the present disclosure, from an angle of view, and FIG. 2 is a structural schematic diagram of the ring shear and seepage-coupled apparatus 100 provided in Embodiments of the present disclosure from another angle of view. Reference can be made to FIG. 1 and FIG. 2.

The ring shear and seepage-coupled apparatus 100 provided in the present example can realize tests of rock tension, compression, ring shear, seepage and mutual coupling by utilizing a ring specimen 105 and through a mode of applying axial load and torque force, so as to achieve uniform force applied to a shear surface and uniform deformation of rocks. It is significant in studying of the shear strength and the residual strength of rocks, perfecting of the strength model of rocks, and comprehensively analyzing of the mechanical characteristics of rocks.

The ring shear and seepage-coupled apparatus 100 comprises a first frame 110, a second frame 130, a first bottom plate 111, a second bottom plate 131, a force transferring plate 143, an axial piston rod 140, a torque transferring shaft 120, jacks 123, an axial force transducer 141, a torque transducer 121, an upper shear box 101, a lower shear box 103 and a seepage structure.

The first frame 110 is in fixed connection with the first bottom plate 111, the second frame 130 is in fixed connection with the second bottom plate 131, the first frame 110 is positioned between the first bottom plate 111 and the second bottom plate 131, and the second frame 130 is positioned at a side of the second bottom plate 131, with the side away from the first bottom plate 111. Specifically, the first frame 110 includes two first side plates 113 arranged oppositely, the first bottom plate 111 is connected between the two first side plates 113, and the first bottom plate 111 is positioned at a middle-lower portion of the first side plate 113. A plurality of support rods 125 are further arranged in the first frame 110, and preferably, a front portion and a rear portion of the first side plate 113 are each provided with two support rods 125. Both ends of each support rod 125 are fixed on the first side plates 113 respectively. The two first side plates 113 are each provided with corresponding bolt holes. The first side plate 113 and the support rods 125 are in fixed connection with each other through bolts. The plurality of support rods 125 are used to stabilize the whole ring shear and seepage-coupled apparatus 100, ensuring the stability during the process of applying a load and a torque, and increasing the test accuracy and the precision of the test results.

Tops of the two first side plates 113 are in connection with the second bottom plate 131. The second frame 130 is fixedly connected on the second bottom plate 131. The second frame 130 includes two second side plates 133 arranged oppositely and a cover plate 135 connecting the second side plates 133. One end of each second side plate 133 away from the cover plate 135 is provided with a mounting part 1331 in a protruding way, for enabling the second side plate to be detachably connected with the second bottom plate 131. Preferably, bolted connection is used here.

The upper shear box 101 and the lower shear box 103 are provided in the second frame 130. A specimen 105 is fixedly arranged between the upper shear box 101 and the lower shear box 103. In the present example, a rock specimen 105 is used, of course it may also be used for studying mechanical properties of other materials. The structural forms of the upper shear box 101 and the lower shear box 103 are both consistent with the shape of the specimen 105. The upper shear box 101 and the lower shear box 103 are usually firmly adhered to the specimen 105 by using an adhesive, to form one piece, with the upper shear box 101, the lower shear box 103 and the specimen 105 positioned on the same axis, to ensure that an axial load or a torque is evenly loaded to the specimen 105. The upper shear box 101 and the axial piston rod 140 are in fixed connection with each other, and the lower shear box 103 and the torque transferring shaft 120 are in fixed connection with each other. The torque transferring shaft 120 is provided thereon with a torque transducer 121, wherein the torque transferring shaft 120 is configured to transmit a torque to the specimen 105, and the torque transducer 121 is configured to detect the loaded torque. The axial force transducer 141 is provided on the axial piston rod 140, wherein the axial piston rod 140 is configured to apply an axial load to the specimen 105, and the axial force transducer 141 is configured to detect the loaded axial load, wherein the axial load may be tensile force or may also be pressure.

The torque transferring shaft 120 has one end fixedly connected onto the first bottom plate 111, and the other end penetrating through the second bottom plate 131 and fixedly connected with the lower shear box 103. The torque transferring shaft 120 is in fixed connection with the first bottom plate 111 via a bolt. The torque transducer 121 is sleeved over the outer surface of the torque transferring shaft 120 and fixedly connected with the torque transferring shaft. Each of the first side plates 113 is fixedly mounted with a jack 123, and the jacks 123 on the two first side plates 113 are oppositely arranged. Each jack 123 has one end fixed connected with the first side plate 113 through a bolt, and the other end connected with the torque transferring shaft 120. A torque is applied to the torque transferring shaft 120 through the jack 123, and the torque transferring shaft 120 transmits the torque to the lower shear box 103, to perform a torque loading test on the specimen 105.

The axial piston rod 140 penetrates through the cover plate 135 of the second frame 130 and is in fixed connection with the upper shear box 101, and applying of an axial tensile force or an axial pressure to the upper shear box 101 can be realized just through upward and downward movement of the axial piston rod 140, which means that an axial load is applied to the specimen 105, as the upper shear box 101, the lower shear box 103 and the specimen 105 are adhered together into one piece, completing the loading test of an axial load. The force transferring plate 143 is provided inside the second frame 130, and the force transferring plate 143 is in fixed connection with the upper shear box 101. The force transferring plate 143 is configured to transmit a counter force for applying a torque, so as to maintain the upper shear box 101 stable. Linear guideways 145 are provided on inner side walls of the second frame 130, that is, linear guideways 145 are provided on opposite inner surfaces of the second side plate 133. Each linear guideway 145 is mounted thereon with a sliding block 147 slidable relative to the linear guideway 145. The force transferring plate 143 is in fixed connection with the sliding block 147 and can slide along the linear guideway 145.

It should be clarified that in order to enable high success rate of the loading tests and more accurate test results, upper and lower surfaces of the first bottom plate 111, the second bottom plate 131, the upper shear box 101, the lower shear box 103 and the force transferring plate 143, and two end faces of the axial piston rod 140 and two end faces of the torque transferring shaft 120 should be arranged to be parallel with each other. The jacks 123 and the torque transducer 121 are mounted in parallel with each other, and the jacks 123 and the torque transducer 121 are all perpendicular to the first side plate 113 of the first frame 110. The linear guideway 145 is parallel with a side wall of the second frame 130, and the linear guideway 145 and the second bottom plate 131 are perpendicular to each other. In this way, when an axial load is loaded, the specimen 105 would only be subjected to tensile force or pressure in an axial direction without any component force in other directions; similarly, when a torque is applied, it enables uniform force applied to a shear surface and uniform deformation of the specimen 105, hereby improving the test precision.

The seepage structure includes a circumferential seepage structure and a radial seepage structure, wherein the circumferential seepage structure is used for performing a circumferential seepage test and the radial seepage structure is used for performing a radial seepage test.

Figure 3:
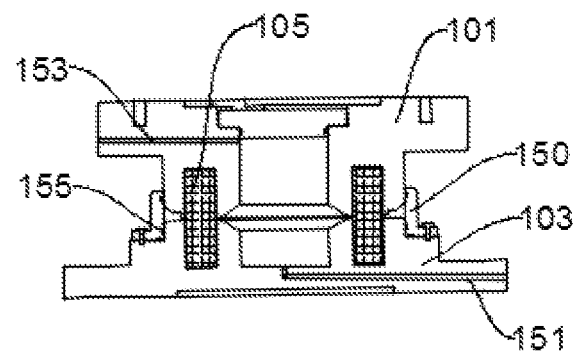
FIG. 3 is a structural schematic diagram of a radial seepage structure of the ring shear and seepage-coupled apparatus for rock and rock fracture under tension or compression stress provided in Embodiments of the present disclosure, from an angle of view.
Figure 4:
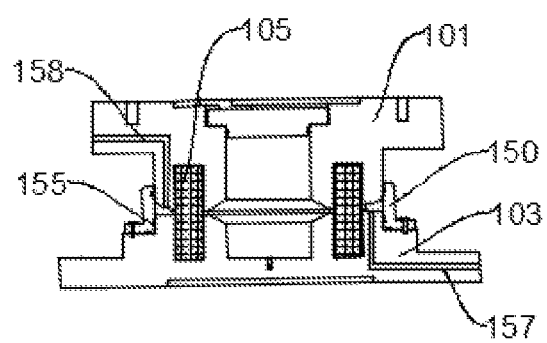
FIG. 4 is a structural schematic diagram of a radial seepage structure of the ring shear and seepage-coupled apparatus for rock and rock fracture under tension or compression stress provided in Embodiments of the present disclosure, from another angle of view.

FIG. 3 is a structural schematic diagram of a radial seepage structure of the ring shear and seepage-coupled apparatus 100 provided in Embodiments of the present disclosure, from an angle of view, and FIG. 4 is a structural schematic diagram of a radial seepage structure of the ring shear and seepage-coupled apparatus 100 provided in Embodiments of the present disclosure from another angle of view. Reference can be made to FIG. 3 and FIG. 4.

The radial seepage structure includes a sealing sleeve 150, a first water inlet channel 151, a first gas exhaust channel 153, a second water inlet channel 157 and a second gas exhaust channel 158. The sealing sleeve 150 is in fixed connection with the upper shear box 101 and the lower shear box 103 respectively. The sealing sleeve 150 is in fixed connection with the lower shear box 103 via bolts. Sealing rings 155 are provided between the sealing sleeve 150 and the upper shear box 101 and between the sealing sleeve and the lower shear box 103 respectively, so as to improve the sealing between the upper shear box 101 and the lower shear box 103.

The first water inlet channel 151 is provided at the lower shear box 103, the first gas exhaust channel 153 is provided at the upper shear box 101, and the first water inlet channel 151 and the first gas exhaust channel 153 are in communication with each other through a hollow portion of the specimen 105, hereby forming an internal seepage channel. The second water inlet channel 157 is provided at the lower shear box 103 and positioned at an outside of the specimen 105, the second gas exhaust channel 158 is provided at the upper shear box 101 and positioned at the outside of the specimen 105, and the second water inlet channel 157 and the second gas exhaust channel 158 are in communication with each other, hereby forming an external seepage channel. This radial seepage structure realizes seepage perpendicular to the shear surface of the specimen 105 and improves the function of existing testing devices, in which only seepage along the shear surface can be realized. Combination with the functions of tension, compression and ring shear of the testing device is of great significance for studying of the seepage characteristics of the shear surface and the structural surface.

Figure 5:
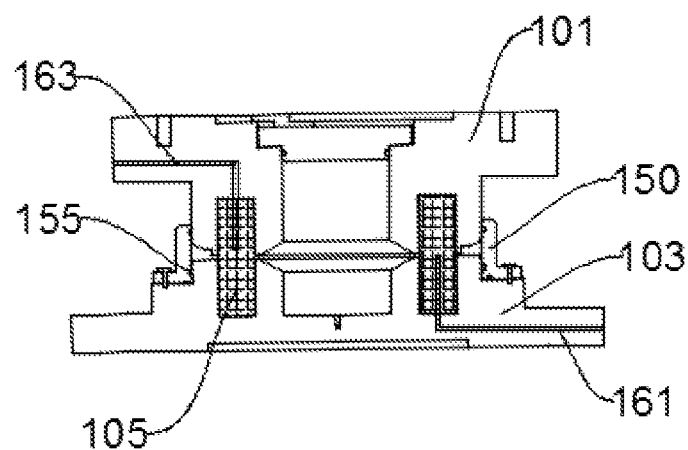
FIG. 5 is a structural schematic diagram of a circumferential seepage structure of the ring shear and seepage-coupled apparatus for rock and rock fracture under tension or compression stress provided in Embodiments of the present disclosure, from an angle of view.

FIG. 5 is a structural schematic diagram of a circumferential seepage structure of the ring shear and seepage-coupled apparatus 100 provided in Embodiments of the present disclosure from an angle of view, and reference can be made to FIG. 5.

The circumferential seepage structure includes a sealing sleeve 150, a third water inlet channel 161 and a third water drainage channel 163. The sealing sleeve 150 is in fixed connection with the upper shear box 101 and the lower shear box 103 respectively. The sealing sleeve 150 is in fixed connection with the lower shear box 103 via bolts. The third water inlet channel 161 is provided at the lower shear box 103, the third water drainage channel 163 is provided at the upper shear box 101, and the specimen 105 is provided with a flow channel enabling the third water inlet channel 161 to be in communication with the third water drainage channel 163, hereby forming a circumferential seepage channel. Sealing rings 155 are provided between the sealing sleeve 150 and the upper shear box 101 and between the sealing sleeve and the lower shear box 103 respectively, and silica gel is coated to interspaces of the specimen 105, for improving the sealing. With the applying of a shear force, the third water inlet channel 161 is filled with water, and the water volume is observed at the third water drainage channel 163, realizing seepage along the shear surface of the specimen 105, wherein the seepage direction is parallel to the shear surface.

It is worth noting that the detachable connection mode or fixed connection mentioned in the context can also be realized through, other than a bolted connection, fixed connection modes, such as threaded connection, sleeved connection, adhesive connection, snap-fitted connection, fastening connection, welded connection, riveted connection, and the like.

The ring shear and seepage-coupled test system for rock and rock fracture under tension or compression stress provided in the present example comprises a servo pump, a hydraulic cylinder and the ring shear and seepage-coupled apparatus 100 as mentioned above, with the axial piston rod 140 being provided within the hydraulic cylinder, and the servo pump being in connection with the hydraulic cylinder for controlling the movement of the axial piston rod 140. Oil transportation of the hydraulic cylinder is controlled by the servo pump, such that the piston rod applies an axial load, and oil transportation of the hydraulic cylinder is controlled through the servo pump, such that the jack 123 applies a torque, wherein the control during the loading process is precise, and the tests have small error, high precision and are easy to operate and control.

As to the ring shear and seepage-coupled apparatus 100 and the ring shear and seepage-coupled test system for rock and rock fracture under tension or compression stress provided in the present disclosure, the mounting process and the testing process are as follows.

A hollow cylindrical rock specimen 105 is prepared; an adhesive is applied to a bottom and side walls of a groove of the upper shear box 101 and a bottom and side walls of a groove of the lower shear box 103, and the rock specimen 105 is adhered together with the upper shear box 101 and the lower shear box 103, wherein it is ensured that the surfaces of the lower shear box 103, the rock specimen 105 and the upper shear box 101 are parallel to each other and positioned on the same center line, and the rock specimen 105, the lower shear box 103 and the upper shear box 101 are connected into one piece. The lower shear box 103 is in fixed connection with the torque transferring shaft 120 through bolts, wherein it is ensured that the lower shear box 103 is horizontally connected with an end of the torque transferring shaft 120; and the upper shear box 101 is in connection with an end of the axial piston rod 140 through a bolt, wherein it is ensured that the upper shear box 101 is horizontally connected with the end of the axial piston rod 140.

The torque transferring shaft 120 penetrates through the first bottom plate 111, the jacks 123, the torque transducer 121 and the second bottom plate 131, and is in connection with the lower shear box 103. An end of the torque transferring shaft 120 is horizontally parallel to the upper and lower surfaces of the second bottom plate 131 and the upper and lower surfaces of the lower shear box 103. The torque transferring shaft 120 transmits the torque outputted by the jack 123 to the lower shear box 103, such that the rock specimen 105 is subjected to a shear force. The axial piston rod 140 penetrates through the force transferring plate 143 and the axial force transducer 141, and is in connection with the upper shear box 101. The lower surface of the axial piston rod 140 is horizontally parallel to the upper and lower surfaces of the force transferring plate 143, the upper and lower surfaces of the lower shear box 103 and the upper and lower surfaces of the upper shear box 101. The linear guideways 145 are in fixed connected with the second side plates 133 of the second frame 130 through bolts, and the sliding blocks 147 slide on the linear guideways 145. The force transferring plate 143 is perpendicularly connected with the sliding block 147 through the axial piston rod 140, hereby realizing the transmission of an axial load. When a torque is applied, the upper shear box 101 is ensured to be at a fixed position, counter force of the torque is transmitted through the force transferring plate 143, the sliding blocks 147 and the linear guideways 145 to the second frame 130, so as to realize independent or mixed loading of axial force (tensile force, pressure).

When an axial pressure is loaded, oil is supplied to a space above the axial piston rod 140 through a hydraulic servo pump, to push the axial piston rod 140 to move downwards and apply the axial pressure. The loading of the axial pressure is continued until the axial force transducer 141 reaches a set value, and when the test is over and the axial pressure needs to be unloaded, oil is supplied to a space below the axial piston rod 140 through the hydraulic servo pump to lift the piston rod.

When an axial tensile force is loaded, oil is supplied to the space below the axial piston rod 140 through the hydraulic servo pump to push the axial piston rod 140 to move upwards and apply the axial tensile force. The loading of the axial tensile force is continued until the axial force transducer 141 reaches a set value, and when the test is over and the axial tensile force needs to be unloaded, oil is supplied to the space above the axial piston rod 140 through the hydraulic servo pump, such that the piston rod moves downwards.

When a torque is loaded, oil is supplied to the jacks 123 through the hydraulic servo pump, until that the torque transducer 121 reaches a set value, and the oil pressures of the jacks 123 are unloaded when the test is over.

When needing to perform a radial seepage test, the sealing sleeve 150 is in fixed connection with the lower shear box 103 through bolts, water is filled inside the rock specimen 105 through the first water inlet channel 151 and the first gas exhaust channel 153, wherein if air bubbles no longer appear in the first gas exhaust channel 153 and water is continuously discharged out, it is regarded that the gas exhaust is completed, and at this time, the first gas exhaust channel 153 is closed. The sealing sleeve 150 is filled with water through the second water inlet channel 157 and the second gas exhaust channel 158, wherein if air bubbles no longer appear in the second gas exhaust channel 158 and water is continuously discharged out, it is regarded that the gas exhaust is completed, and at this time, the second gas exhaust channel 158 is closed. According to the test requirements, an internal water pressure and an external water pressure are loaded respectively through the first water inlet channel 151 and the second water inlet channel 157, until preset target values are reached, and the subsequent test is performed.

When needing to perform a circumferential seepage test, a flow channel, corresponding to the third water inlet channel 161 and the third water drainage channel 163, is drilled on a ring rock specimen 105, and silica gel is applied to interspaces of the rock specimen 105 to realize sealing. The sealing sleeve 150 is in fixed connection with the lower shear box 103 through bolts, and along with the applying of a shear force, water is injected into the third water inlet channel 161, and the water volume is observed at the outlet of the third water drainage channel 163, realizing seepage along the shear surface of the rock specimen 105, wherein the seepage direction is parallel to the shear surface.

When the test is completed and the rock specimen 105 is taken out, the bolt(s) for connecting the upper shear box 101 and the axial piston rod 140 is removed and the upper shear box 101 is taken out. The bolt(s) for connecting the lower shear box 103 and the torque transferring shaft 120 is removed, and the lower shear box 103 is taken out. The rock specimen 105 is separated from the upper shear box 101 and the lower shear box 103 through a mode of high-temperature heating or gel dissolution.

Through the operation of the above steps, tests of rock tension, compression, ring shear, seepage and mutual coupling can be realized, which has a significant meaning for accurate acquisition of shear strength, residual strength and deformation of rocks, and for the improvement and perfection of the constitutive relation of rocks. This radial seepage structure realizes a seepage perpendicular to the shear surface of the rock specimen 105 and improves the function of existing testing devices, in which only seepage along the shear surface can be realized. Combination with the function of tension, compression and ring shear of testers is of great significance for studying of the seepage characteristics of the shear surface and the structural surface. This circumferential seepage structure realizes seepage parallel to the shear surface of the rock specimen 105, and compared with the limitations of conventional seepage tests, seepage along various test paths can be realized, enriching and completing the study of seepage characteristics of the shear surface.

In summary, the ring shear and seepage-coupled apparatus 100 and the ring shear and seepage-coupled test system for rock and rock fracture under tension or compression stress provided in the present disclosure have beneficial effects in the following several aspects.

The ring shear and seepage-coupled apparatus 100 provided in the present disclosure has a simple structure and enables convenient operation and control. Advantages of high control precision, increased torque or load application, accurate torque measurement and small frictional force, etc. can be achieved through a torque applying and measuring unit composed of the jacks 123, the torque transducer 121 and the torque transferring shaft 120. Advantages of high control precision, the function of simultaneously loading and measuring a tensile force or a pressure, and great output load value can be achieved through an axial loading and measuring unit composed of the axial piston rod 140, the axial force transducer 141, the force transferring plate 143, the sliding blocks 147 and the linear guideways 145. The force transferring plate 143 is in connection with the second side plate 133, realizing independent and coupled applying of an axial load and a torque, and the load is transmitted to the second frame 130, ensuring the stability of the whole ring shear and seepage-coupled apparatus 100 and stable applying of the load during the loading process in the test. Moreover, this ring shear and seepage-coupled apparatus 100 can realize seepage of various test paths, and enrich and perfect the study of seepage characteristics of the shear surface. As for the ring shear and seepage-coupled test system for rock and rock fracture under tension or compression stress provided in the disclosure, a hydraulic servo pump is used, which enables accurate control, easy operation and control, small errors, high test precision, and greatly increases the test efficiency and the success rate.

The above are merely preferred examples of the present disclosure, and are not intended to limit the present disclosure. For a person skilled in the art, the present disclosure might be modified, combined and changed in various ways. Any modifications, equivalent substitutions and improvements made within the spirit and principle of the present disclosure shall all be covered in the scope of protection of the present disclosure.

The invention claimed is:

1. A ring shear and seepage-coupled apparatus for rock and rock fracture under tension or compression stress, comprising a first frame, a second frame, a first bottom plate, a second bottom plate, an axial piston rod, a torque transferring shaft, an axial force transducer, a torque transducer, an upper shear box, a lower shear box and a seepage structure, wherein the first frame is in fixed connection with the first bottom plate, the second frame is in fixed connection with the second bottom plate, the first frame is positioned between the first bottom plate and the second bottom plate, and the second frame is positioned at a side of the second bottom plate, with the side away from the first bottom plate; the upper shear box and the lower shear box are positioned in the second frame, a specimen is fixedly arranged between the upper shear box and the lower shear box, and the upper shear box, the lower shear box and the specimen are positioned on a same axis;

the torque transducer is provided on the torque transferring shaft; the torque transferring shaft has one end fixedly connected onto the first bottom plate, and the other end penetrating through the second bottom plate and fixedly connected with the lower shear box, so as to transmit a torque to the specimen; the axial force transducer is provided on the axial piston rod, and the axial piston rod is in fixed connection with the upper shear box, for applying an axial load on the specimen; and the seepage structure comprises a circumferential seepage structure and a radial seepage structure, wherein the circumferential seepage structure is configured for performing a circumferential seepage test, and the radial seepage structure is configured for performing a radial seepage test.

2. The ring shear and seepage-coupled apparatus for rock and rock fracture under tension or compression stress according to claim 1, wherein jacks are provided within the first frame, and the jacks are in fixed connection with two sides of the first frame for exerting a torque on the torque transferring shaft.

3. The ring shear and seepage-coupled apparatus for rock and rock fracture under tension or compression stress according to claim 2, wherein a force transferring plate is provided within the second frame, the force transferring plate is in fixed connection with the upper shear box, two ends of the force transferring plate are respectively in connection with the second frame, and slidable along inner walls of the second frame, and the force transferring plate is configured to transmit a counter force for applying a torque, so as to maintain the upper shear box stable.

4. The ring shear and seepage-coupled apparatus for rock and rock fracture under tension or compression stress according to claim 3, wherein linear guideways are provided on inner side walls of the second frame, each linear guideway is provided thereon with a sliding block slidable relative to the linear guideway, and the force transferring plate is in fixed connection with the sliding blocks and slidable along the linear guideways.

5. The ring shear and seepage-coupled apparatus for rock and rock fracture under tension or compression stress according to claim 4, wherein each jack and the torque transducer are mounted in parallel with each other, and the jack and the torque transducer are both perpendicular to a side wall of the first frame; and the linear guideway is parallel with a side wall of the second frame, and the linear guideway and the second bottom plate are perpendicular to each other.

6. The ring shear and seepage-coupled apparatus for rock and rock fracture under tension or compression stress according to claim 3, wherein upper and lower surfaces of the first bottom plate, the second bottom plate, the upper shear box, the lower shear box and the force transferring plate, and two end faces of the axial piston rod and two end faces of the torque transferring shaft are parallel with each other.

7. The ring shear and seepage-coupled apparatus for rock and rock fracture under tension or compression stress according to claim 1, wherein a plurality of support rods are provided within the first frame, and two ends of each support rod are fixed at two sides of the first frame for stabilizing the ring shear and seepage-coupled apparatus for rock and rock fracture under tension or compression stress.

8. The ring shear and seepage-coupled apparatus for rock and rock fracture under tension or compression stress according to claim 1, wherein the radial seepage structure comprises a sealing sleeve, a first water inlet channel, a first gas exhaust channel, a second water inlet channel and a second gas exhaust channel; and the sealing sleeve is in fixed connection with the upper shear box and the lower shear box respectively, and sealing rings are provided between the sealing sleeve and the upper shear box and between the sealing sleeve and the lower shear box, respectively; and
the first water inlet channel is provided at the lower shear box, the first gas exhaust channel is provided at the upper shear box, and the first water inlet channel and the first gas exhaust channel are in communication with each other through a hollow portion of the specimen, forming an internal seepage channel; and the second water inlet channel is provided at the lower shear box and positioned at an outside of the specimen, the second gas exhaust channel is provided at the upper shear box and positioned at the outside of the specimen, and the second water inlet channel and the second gas exhaust channel are in communication with each other, forming an external seepage channel.

9. The ring shear and seepage-coupled apparatus for rock and rock fracture under tension or compression stress according to claim 1, wherein the circumferential seepage structure comprises a sealing sleeve, a third water inlet channel and a third water drainage channel; the sealing sleeve is in fixed connection with the upper shear box and the lower shear box respectively, and sealing rings are provided between the sealing sleeve and the upper shear box and between the sealing sleeve and the lower shear box respectively; and
the third water inlet channel is provided at the lower shear box, the third water drainage channel is provided at the upper shear box, and the specimen is provided with a flow channel enabling the third water inlet channel in communication with the third water drainage channel, forming a circumferential seepage channel.

10. A ring shear and seepage-coupled test system for rock and rock fracture under tension or compression stress, comprising a servo pump, a hydraulic cylinder and the ring shear and seepage-coupled apparatus for rock and rock fracture under tension or compression stress according to claim 1, with the axial piston rod being provided within the hydraulic cylinder, and the servo pump being in connection with the hydraulic cylinder for controlling movement of the axial piston rod.

11. The ring shear and seepage-coupled test system for rock and rock fracture under tension or compression stress according to claim 10, wherein jacks are provided within the first frame, and the jacks are in fixed connection with two sides of the first frame for exerting a torque on the torque transferring shaft.

12. The ring shear and seepage-coupled test system for rock and rock fracture under tension or compression stress according to claim 11, wherein a force transferring plate is provided within the second frame, the force transferring plate is in fixed connection with the upper shear box, two ends of the force transferring plate are respectively in connection with the second frame, and slidable along inner walls of the second frame, and the force transferring plate is configured to transmit a counter force for applying a torque, so as to maintain the upper shear box stable.

13. The ring shear and seepage-coupled test system for rock and rock fracture under tension or compression stress according to claim 12, wherein linear guideways are provided on inner side walls of the second frame, each linear guideway is provided thereon with a sliding block slidable relative to the linear guideway, and the force transferring plate is in fixed connection with the sliding blocks and slidable along the linear guideways.

14. The ring shear and seepage-coupled test system for rock and rock fracture under tension or compression stress according to claim 13, wherein each jack and the torque transducer are mounted in parallel with each other, and the jack and the torque transducer are both perpendicular to a side wall of the first frame; and the linear guideway is parallel with a side wall of the second frame, and the linear guideway and the second bottom plate are perpendicular to each other.

15. The ring shear and seepage-coupled test system for rock and rock fracture under tension or compression stress according to claim 12, wherein upper and lower surfaces of the first bottom plate, the second bottom plate, the upper shear box, the lower shear box and the force transferring plate, and two end faces of the axial piston rod and two end faces of the torque transferring shaft are parallel with each other.

16. The ring shear and seepage-coupled test system for rock and rock fracture under tension or compression stress according to claim 10, wherein a plurality of support rods are provided within the first frame, and two ends of each support rod are fixed at two sides of the first frame for stabilizing the ring shear and seepage-coupled apparatus for rock and rock fracture under tension or compression stress.

17. The ring shear and seepage-coupled test system for rock and rock fracture under tension or compression stress according to claim 10, wherein the radial seepage structure comprises a sealing sleeve, a first water inlet channel, a first gas exhaust channel, a second water inlet channel and a second gas exhaust channel; and the sealing sleeve is in fixed connection with the upper shear box and the lower shear box respectively, and sealing rings are provided between the sealing sleeve and the upper shear box and between the sealing sleeve and the lower shear box, respectively; and the first water inlet channel is provided at the lower shear box, the first gas exhaust channel is provided at the upper shear box, and the first water inlet channel and the first gas exhaust channel are in communication with each other through a hollow portion of the specimen, forming an internal seepage channel; and the second water inlet channel is provided at the lower shear box and positioned at an outside of the specimen, the second gas exhaust channel is provided at the upper shear box and positioned at the outside of the specimen, and the second water inlet channel and the second gas exhaust channel are in communication with each other, forming an external seepage channel.

18. The ring shear and seepage-coupled test system for rock and rock fracture under tension or compression stress according to claim 10, wherein the circumferential seepage structure comprises a sealing sleeve, a third water inlet channel and a third water drainage channel; the sealing sleeve is in fixed connection with the upper shear box and the lower shear box respectively, and sealing rings are provided between the sealing sleeve and the upper shear box and between the sealing sleeve and the lower shear box respectively; and the third water inlet channel is provided at the lower shear box, the third water drainage channel is provided at the upper shear box, and the specimen is provided with a flow channel enabling the third water inlet channel in communication with the third water drainage channel, forming a circumferential seepage channel.

* * * * *